Dec. 1, 1936. J. D. NORTH 2,062,599
AEROPLANE
Filed Dec. 6, 1934 5 Sheets—Sheet 1
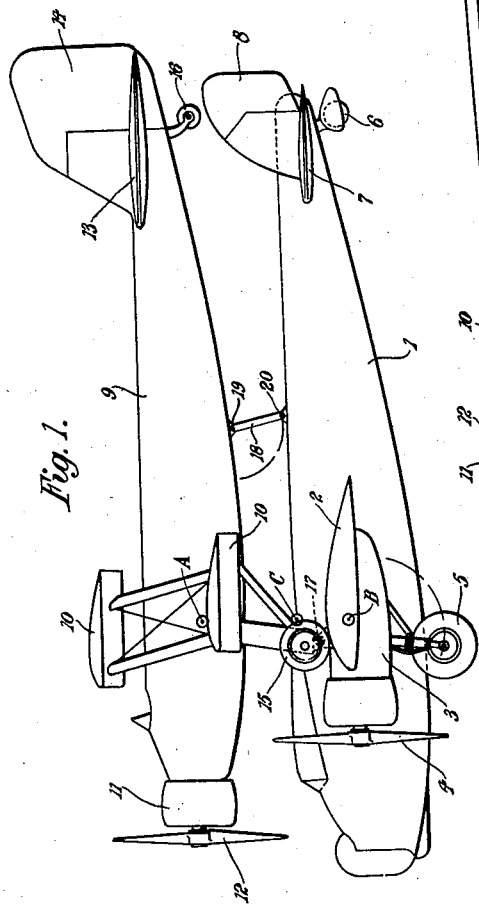
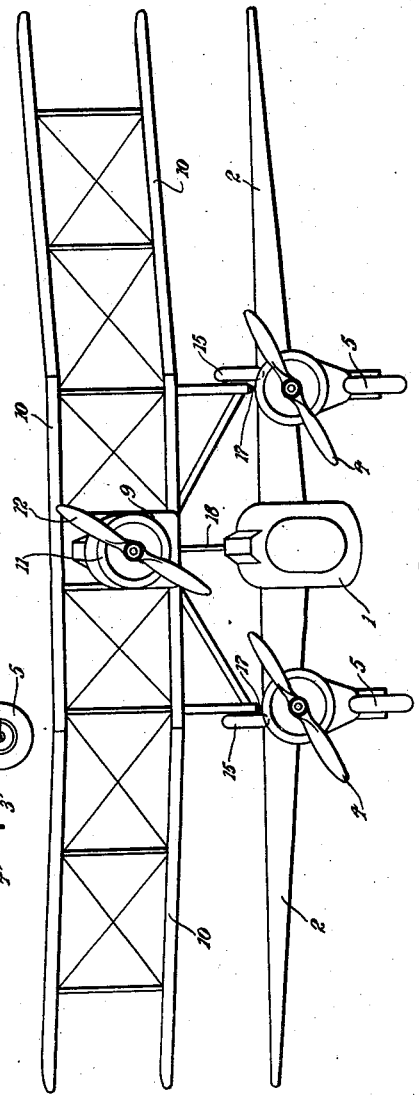

Dec. 1, 1936.  J. D. NORTH  2,062,599
AEROPLANE
Filed Dec. 6, 1934  5 Sheets-Sheet 2
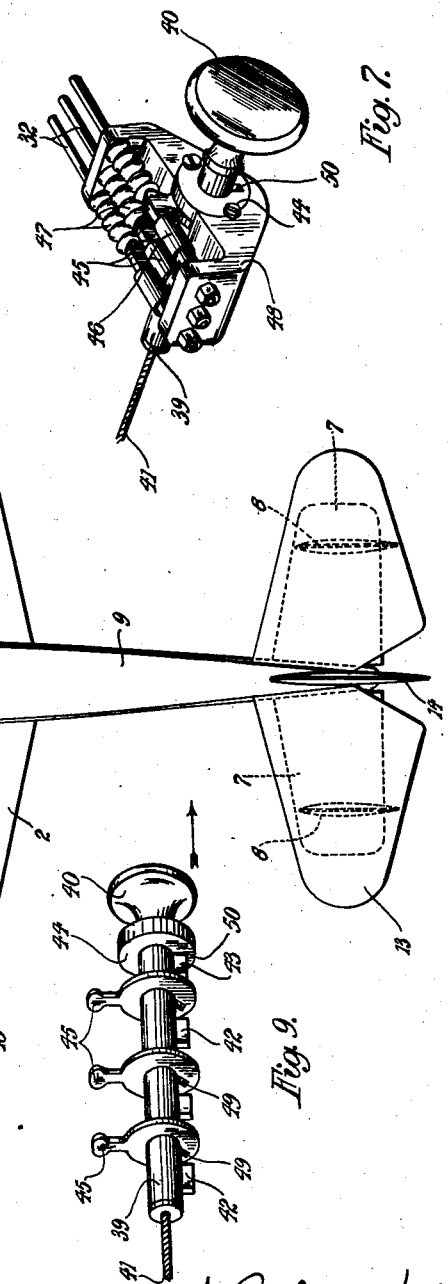
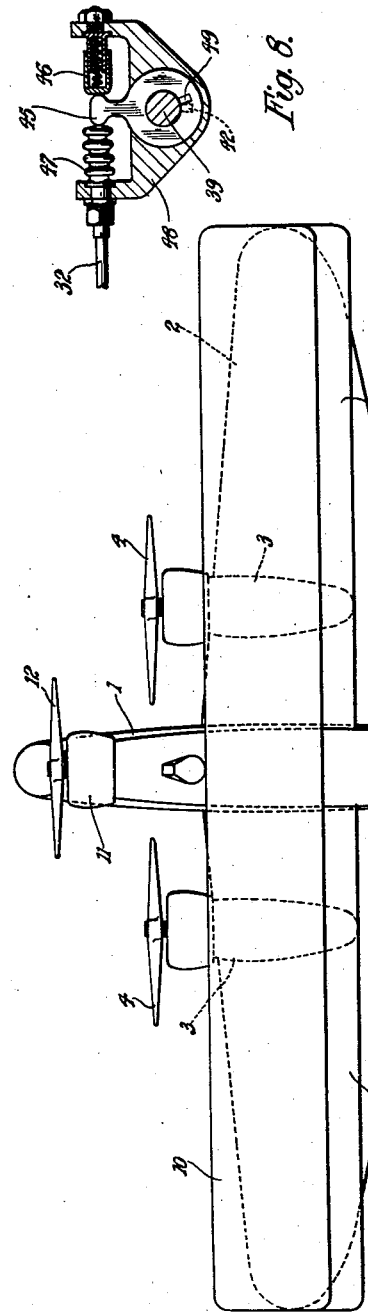
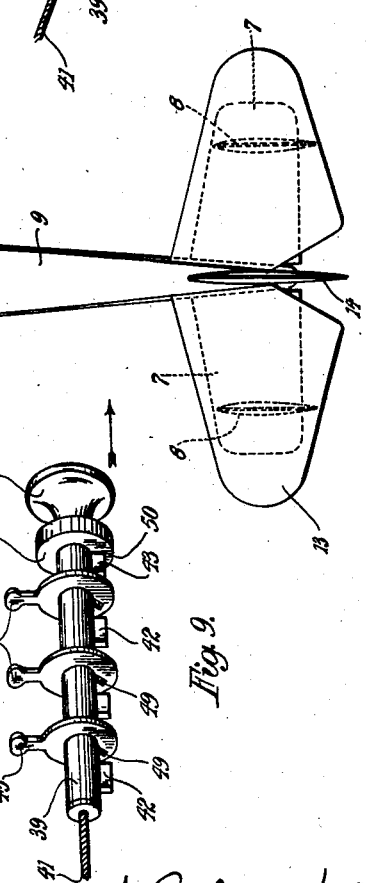

Dec. 1, 1936. J. D. NORTH 2,062,599
AEROPLANE
Filed Dec. 6, 1934 5 Sheets-Sheet 3

John Dudley North
Inventor

Dec. 1, 1936.  J. D. NORTH  2,062,599
AEROPLANE
Filed Dec. 6, 1934  5 Sheets-Sheet 4
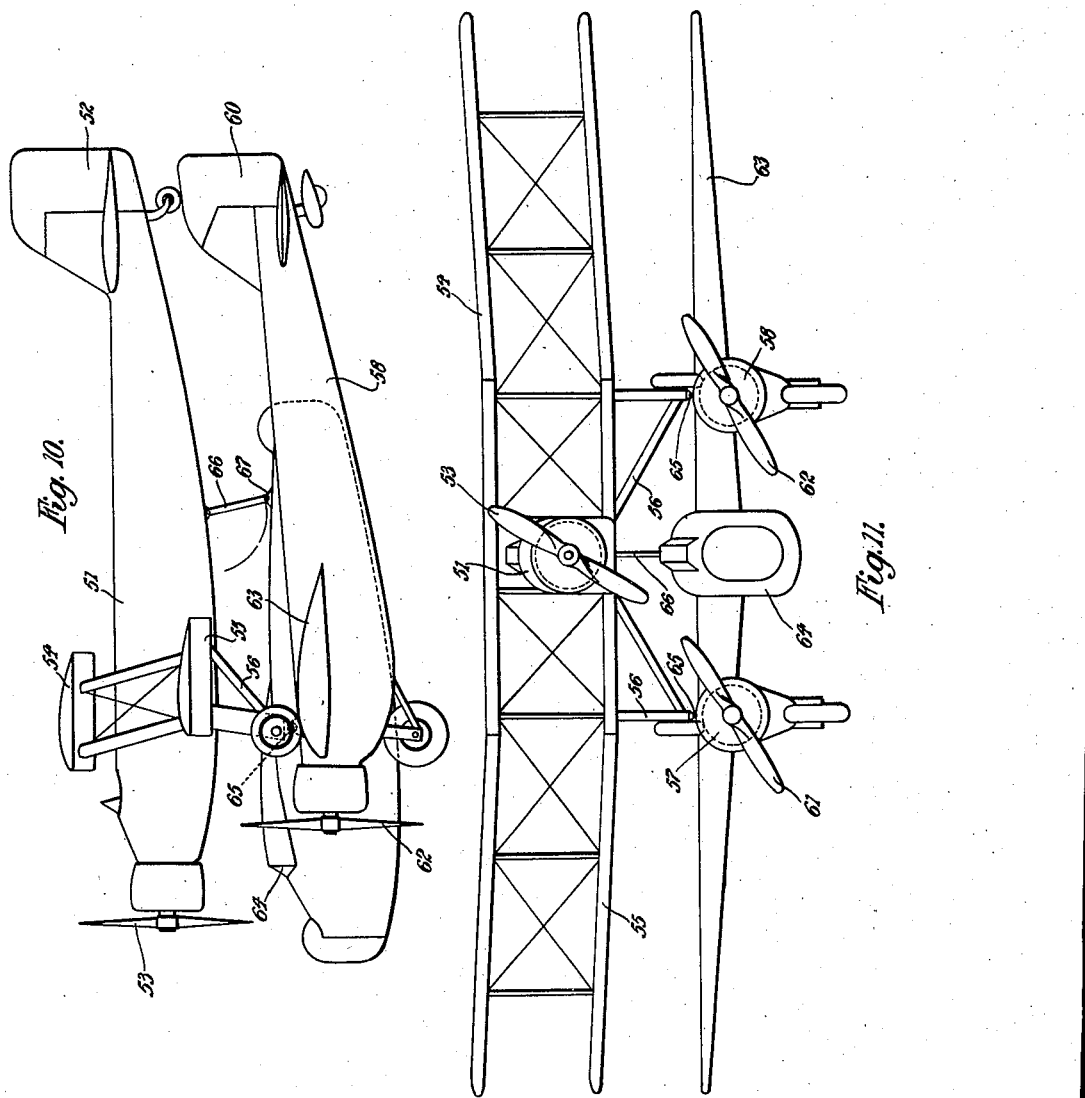

Dec. 1, 1936.        J. D. NORTH         2,062,599
                      AEROPLANE
              Filed Dec. 6, 1934    5 Sheets-Sheet 5
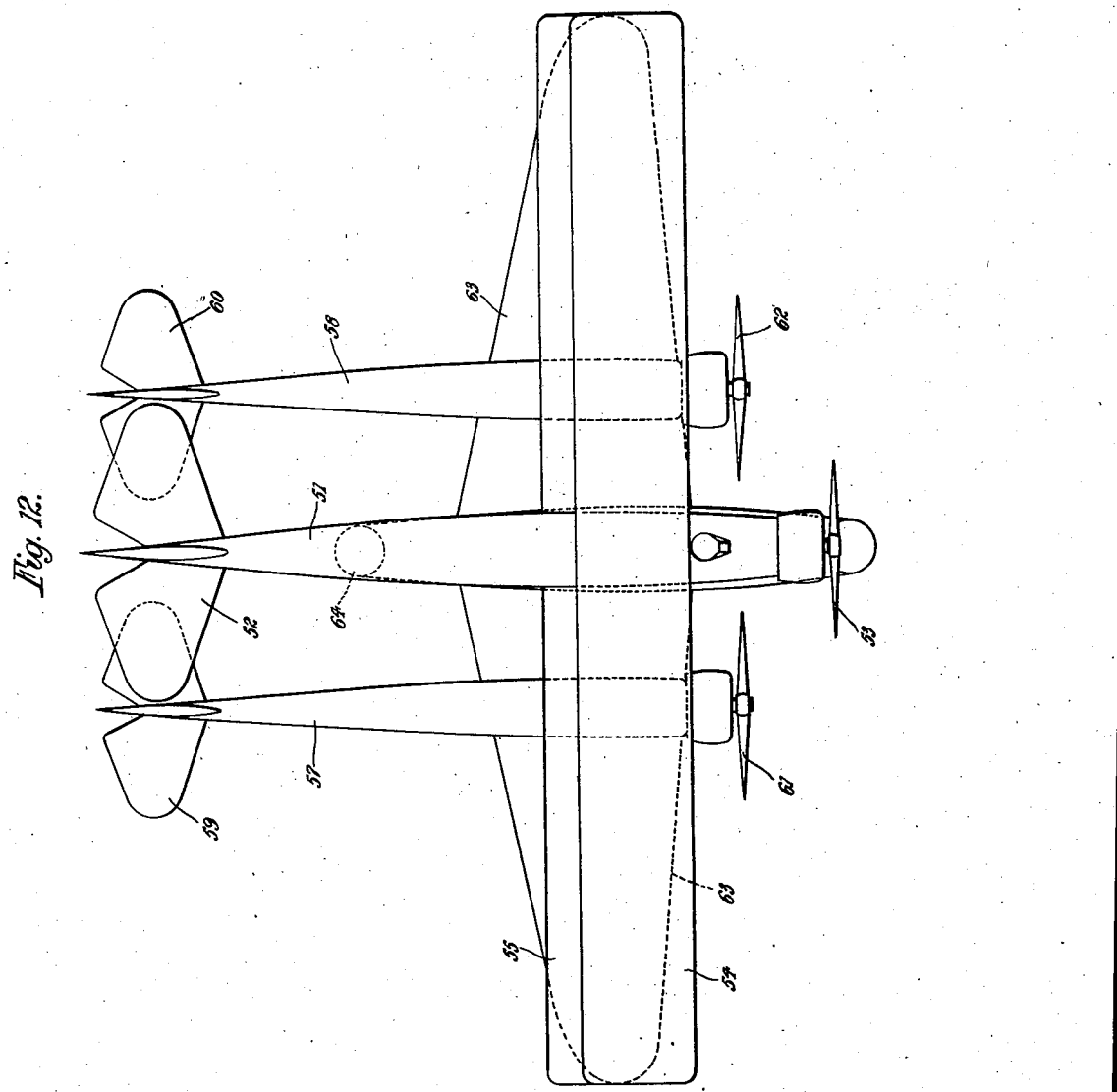

UNITED STATES PATENT OFFICE 2,062,599

AEROPLANE

John Dudley North, Eaton, Norwich, England, assignor to Boulton Paul Aircraft Limited, Norfolk, England Application December 6, 1934, Serial No. 756,340
In Great Britain December 11, 1933

5 Claims. (Cl. 244—2)

It is well known that in an aeroplane intended for economical transport at high speeds and/or over long ranges it is desirable that the dimensions of the aircraft itself should be as small as possible, and in particular that the wing area should be the minimum possible, i. e., that the wing loading should be heavy.

Practical limits are set to the use of heavy wing loadings by the fact that the minimum speed at which an aeroplane can support itself in the air increases with increase in wing loading. Consequently a heavily wing loaded aircraft must accelerate to a high speed on the ground or other surface and will require a very large space in which to reach the speed required to lift it from the ground or other surface.

A further aggravation of this difficulty arises because, for economical normal flight, the airscrew and engine fitted to the aeroplane must be designed to operate at or about their maximum efficiency in such normal flight. At speeds below this normal flying speed, the efficiency of the airscrew and the available output of the engine are invariably reduced, and the higher the normal speed for which these units are designed, the smaller is the proportion of the maximum power provided which is available during the period of acceleration on the ground and taking off.

From practical experience it has been found that an upper limit to the wing loading which can be used in practice is set by the problems involved in taking off, and considerable advantages could be obtained both in respect of increased speed, increased range and/or increased useful load, and consequently reduced cost of aerial transport if the difficulties of launching very heavily wing loaded aeroplanes could successfully be overcome.

This difficulty is overcome by a method of using, for the purpose of taking off and climbing to normal operating height, a compound aeroplane composed of two elements. Each of these elements consists of a complete aeroplane capable of independent flight which are so connected one to another that they may be used and flown as a single aeroplane, but may, after having been taken off, be separated into the two component elements.

Of these two component elements one, (hereinafter termed "the main aircraft") is a heavily wing loaded aircraft designed for operation at high speeds, and adapted to carry a large load of fuel, or of armament, or of goods, or of passengers, or the like, or any requisite combination thereof.

The other of the two component elements (hereinafter termed "the auxiliary aircraft") is a lightly wing loaded aeroplane, adapted to carry only a pilot and a limited quantity of fuel.

Further, the main aircraft will be provided with an engine or engines and airscrew or airscrews designed for the normal high speed operation proper to this element alone, whereas the auxiliary aircraft will be provided with an engine or engines and airscrew or airscrews designed for maximum efficiency and output at much lower speeds, i. e., such speeds as would be used in the process of taking off and climbing the complete compound aeroplane.

It will be obvious that when the two elements are combined, the resulting compound aeroplane will have a lower wing loading than that of the main aircraft. In addition the combined engine and airscrew equipment of the compound aeroplane will have a higher average efficiency and output, at low speeds such as are required for taking off, than will the power plant of the main aircraft.

The object of the present invention is to provide particular arrangements of the two elements and a method of ensuring the separation of the main and auxiliary aircraft in the simplest possible manner.

According to the present invention, an aeroplane comprising two aircraft elements mounted one on top of the other and means for rigidly but releasably attaching together so that they both assist in enabling the compound aeroplane to take-off and climb, is characterized in that the lower element is the main aircraft to be launched and the upper element is the auxiliary aircraft to assist in the launching, the upper element being lightly wing loaded so that it is adapted to contribute the lift in excess of its own weight to assist the main aircraft to take-off on its own undercarriage and climb with the result that, on release of the attachments, the upper component will, owing to the excess lift over its own weight, rise relatively to the main aircraft and thus effect separation of the two elements. The landing gear on the lower element extends below the compound aeroplane and on this landing gear the compound aeroplane takes off. The main and auxiliary aircraft, composing the compound aeroplane must be so proportioned that when combined the total wing area and the total weight of the compound aeroplane, and the power of their engines are such that the compound aeroplane will have a moderate wing loading, a high ratio of power to weight and consequently will be able to take-off and climb without difficulty under all normal conditions.

It will be obvious that a compound aeroplane constructed in accordance with the principles outlined above will have characteristics intermediate between those of the two elements of which it is composed. It will have a maximum speed greater than that of the auxiliary aircraft alone, but less than that of the main aircraft alone. It follows, therefore, that when the compound aeroplane is flying, the auxiliary aircraft will be lifting some proportion of the weight of the main aircraft. On the other hand, when the compound aeroplane is flying at or near the maximum speed of which it, as a whole, is capable, the engines and airscrews of the main aircraft will be exerting a thrust greater than that required by the main aircraft at that speed, and consequently the main aircraft will be towing the auxiliary aircraft. The towing force exerted by the main aircraft on the auxiliary aircraft, and the lift force contributed by the auxiliary aircraft towards the support of the main aircraft must be transmitted through the attachments which unite the two elements. Therefore, if under the conditions described, these attachments are released, the main aircraft will immediately accelerate relatively to the auxiliary aircraft, and the auxiliary aircraft will immediately commence to rise relatively to the main aircraft. It will, therefore, be understood that the combination of aircraft elements having the characteristics above outlined provides a method of effecting the separation between main and auxiliary craft in the simplest possible manner.

In order to give to the auxiliary aircraft the necessary aerodynamic characteristics, it will usually be advantageous to employ on this element, a wing system capable of developing a very high lift coefficient. This characteristic may be produced by the use of a wing section which has inherent high lift capacity, or by the use of known auxiliary devices such as slots, flaps, or the like, or by any suitable combination of such devices.

This invention is particularly applicable to the case where the main aircraft is fitted with a supercharged engine, which develops its maximum power only after reaching a considerable height above normal ground level. The use of engines of this type aggravates the difficulties, before mentioned, of taking off. When such a supercharged engine is fitted to the main aircraft and a normal engine developing maximum power at ground level is fitted to the auxiliary aircraft, the improvement in take-off produced by the auxiliary aircraft will be more marked, and, in addition, at the designed operating or rated height of the supercharged engine, the thrust contributed by this engine to the propulsion of the compound aeroplane will be at its maximum, and hence will give the maximum separating thrust, and if release of the two elements takes place at this height, will give increased separating forces.

Following upon such separation, the main aircraft will proceed to its destination and the auxiliary aircraft will return to its base where it will be available for helping in the launching of other similar main aircraft forthwith.

In a compound aeroplane the provision of the necessary conditions to ensure that, at the moment of release, the two elements shall forthwith start to separate can be ensured by the application of known methods of aircraft design. It will, however, be recognized that, in addition to providing such a separating force or forces, it is necessary to ensure that, at the moment of separation, neither of the two aeroplane elements suffer any violent disturbance of their equilibrium. If, for example, at the moment of release the lower aircraft were abruptly to raise its tail, or the upper aircraft abruptly to drop its tail, fouling between the two aircraft might occur, and special methods must be adopted in order to ensure that dangers of this type shall not arise.

In order that the two elements of the compound aeroplane may be capable of performing their duties, it is obvious that both must carry a pilot, and that both must be provided with normal flying controls. In order that the compound aeroplane shall be capable of satisfactory operation, it is essential that during the period of combined flight the control of the compound machine should be entirely in the hands of one pilot only. This pilot in charge may be either the pilot of the main aircraft or the pilot of the auxiliary aircraft, but should preferably be the pilot of the auxiliary aircraft.

In order that the pilot in control of the compound aeroplane shall have the necessary command over the compound aeroplane it is necessary either that the controls of the two aircraft elements should be interconnected, or alternatively that the controls of the aircraft element carrying the pilot in charge shall be sufficiently powerful to control the whole compound aeroplane. The latter alternative has the advantage of greater simplicity and reliability, and in practice will present no difficulty. When this alternative is adopted the controls of the other element of the compound aeroplane, which will preferably be the main aircraft, should either be left free to float under the air forces caused by the machine's motion, or may be locked in a "neutral" position by locking devices, e. g. plungers, which are automatically unlocked when the two aircraft elements are released one from another, and which may, if desired, be locked and unlocked at any time during the combined flight by the pilot in charge.

In order to ensure the avoidance of any disturbance to the equilibrium of the separated elements of the compound aeroplane at or immediately following the moment of release, and to avoid the consequent danger of fouling, load measuring devices such as pressure capsules or the like may be inserted in the attachments which hold the two elements together to form the compound aeroplane. There might for example be three such points of attachment between the two elements, two side by side and at or about the common centre of gravity of the compound aeroplane, and one on the centre line and behind the centre of gravity. The pressure indicators at these three points of attachment would be arranged to be readable by the pilot in charge, and would show to him definitely whether there existed, at the points of attachment, forces in such a sense that release of the attachments would result in separation. Moreover, the relative values of the forces at the three attachment points would indicate whether there existed any force or moment of a nature to disturb the equilibrium of the separated elements when the attachments were released. For example, a large compression load at the rearmost of the three supposed points of attachment would indicate the probability that on release the tails of the aircraft would swing towards each other, and the pilot in charge would be able to delay release until such time as the force indicators showed the correct distribution of load, a condition which could be achieved by correct adjustment of the controls of one or both of the two aircraft. These load measuring devices may be applied to a compound aeroplane in which the main aircraft element is below the auxiliary aircraft element or in which the main aircraft element is attached to the top of an auxiliary aircraft element.

It is recognized that the equilibrium of the two elements may be affected by the very fact of release, since the control surfaces of each element while forming part of the compound aeroplane may be in air affected by the organs of the other element, and during separation may pass into air which may be either more or less affected in this way.

Such disturbances of equilibrium arising during the act of separation will in general be small, and their nature and extent in any given case are capable of investigation for any given case by model experiments or the like. In practice it will be desirable, and probably necessary, to establish by trial and error for any given combination of main and auxiliary aircraft the best distribution of loads between the attachment points for safe release.

The controls for effecting release of the two elements may be connected to the load indicating devices in such a way that release cannot be effected until the load distribution at the attachment points falls within limits predetermined as providing satisfactory conditions for such release.

The necessary adjustment of the control surfaces of the compound aeroplane to secure safe conditions for release may be effected in a number of way, e. g.

(1) By providing interconnection of the control systems, including perhaps a tail adjuster gear, of the two aircraft elements in such a manner that the pilot in charge of the compound aeroplane could operate the control surfaces of both elements either together or independently.

(2) By the pilot in one element in charge of the compound aeroplane issuing instructions to the pilot of the other element to adjust his controls in the required manner, and releasing the aircraft only when the required conditions are attained.

(3) By keeping the controls of one element of the compound aeroplane either floating, or locked in a predetermined position until the moment of release, and making all the necessary adjustments by the use of the control surfaces belonging to the element which carries the pilot in charge.

Of the above alternatives (1) involves undesirable and unnecessary complications. (2) requires only the provision of telephone or similar means of communication between the two pilots, which will be necessary in any event, and presents no difficulty. (3) is possibly the simplest and most satisfactory method to adopt, but under some conditions may not be as satisfactory as (2).

Although the compound aeroplane will not normally be required to land as a compound machine it may nevertheless occur that through failure of engines or other similar emergency it might become necessary to land before the two elements had been separated in which case the undercarriage of the lower element must be adequate for landing when carrying the whole weight of the compound aeroplane. So far as the control of the aeroplane itself is concerned the pilot in charge will require to be in possession of adequate control without special provision being made for this case, except that for landing purposes he will require control of all the engines of the compound aeroplane. This engine control may not be necessary in normal operation but must be provided to meet this emergency. Such a control may be provided in the form of plungers, carried on the element which also carries the pilot in charge and operable by him, which plungers, when the aircraft elements are attached to each other, come into contact with spring loaded levers carried on the other aircraft element and coupled up suitably to the engine throttles. It will be obvious that in this and in any other interconnection of controls which may be used, while the compound aeroplane is flying as one unit a large number of alternative arrangements are possible, the only essential being that all such inter-functional control devices or interconnections are broken at the moment of release of the two aircraft elements and that the breaking of said devices or interconnections leaves the pilot of each aircraft in complete and undisturbed possession of all the controls affected.

It will be obvious that in a compound aeroplane of the type described either element may be either designed to take-off from or alight on land surfaces or water. The compound aeroplane might, for example, be arranged to take-off from land and to return to land whereas the main aircraft might be provided with floats to enable it to alight on water.

The compound aeroplane might be adapted to take-off from a trolley running on a special track and this trolley might be provided with independent motive power to increase the initial acceleration at the start, as for example, a catapult launching gear such as is commonly employed on ships. The trolley may, alternatively, be provided with electric or other motors; be accelerated by a charge of explosive; or by the recoil from the discharge of a projectile; by a propellant rocket; or by gravity, due to the track sloping downwards towards the end of the trolley's run; or by other suitable means.

The main or auxiliary elements of the compound aeroplane may be either monoplanes, biplanes, or multiplanes or any combination thereof. For example, the main lower element might be a monoplane and the auxiliary element a biplane, or vice versa, the compound aeroplane in either such case being a triplane.

Either or both aircraft elements may each have one or more engines, e. g. the main aircraft may have twin engines and the auxiliary a single engine.

Further it may be desirable to provide in the compound aeroplane, guide members arranged so as to limit the relative movement of the two aircraft elements, during the initial period of separation immediately following release, so that danger of fouling between parts of the two elements shall be positively averted. Such a guide member might consist of a member attached to the auxiliary aircraft, provided with a slot extending downwardly and forwardly, open at its lower and forward end, and arranged to accommodate in the slot a pin attached to the main aircraft. The guide member and the pin might, for example, be attached to main and auxiliary aircraft at or near the tail organs of the respective aircraft elements, and when the two were attached to form the compound unit, the pin on the main aircraft would lie in the slot on the guide member attached to the auxiliary aircraft at the upper extremity of the slot. On release the pin would be free to move downward and forward in, and finally to emerge from the slot, but would not be able to move upwards in the slot. Hence, even if the release of the attachments were effected under conditions which caused a tendency for the tails of the two elements to approach and foul, a limit would be set to such approach by the abutment of the pin on the end of the slot. Similar guide members might be provided between the wings of the two aircraft elements, near their outer extremities, for example, which would prevent the wings fouling during the process of release owing to an attempt by the two aircraft to roll relatively one to another. A guide system of this type would also be effective in preventing lateral relative motion of the two aircraft at release which might cause the body of one aircraft to foul, for example, the undercarriage of the other.

It is further necessary that immediately prior to the release of the two elements the pilot in charge of the compound aeroplane shall be enabled so to adjust the relative positions of the control surfaces of the two units as to ensure the absence of any serious disturbance of either element on release. Methods whereby such adjustments may be obtained have been hereinbefore described.

It is an advantage of the present invention that in order to obtain this necessary relative adjustment of the control surfaces for safe release it is not necessary to provide such interconnection between the control systems of the two aircraft that the pilot in charge may operate the control surfaces of both elements either together or independently. At most it will be necessary only for the pilot in charge to give orders to the subordinate pilot by telephone or otherwise to make the necessary adjustments in the controls of the aircraft element to which that subsidiary pilot is attached, the pilot in charge himself making such further adjustments as may be necessary on his own aircraft element in the ordinary way.

A compound aeroplane according to this invention is illustrated, by way of example, in the accompanying drawings in which:—

Fig. 1 is a side elevation.

Fig. 2 is a front elevation.

Fig. 3 is a plan view.

Fig. 7 is a perspective view of a compound lock suitable for use on a compound aeroplane having three points of releasable attachment between the components each provided with a pressure sensitive device.

Fig. 8 is a sectional view of the lock shown in Fig. 7.

Fig. 9 is a diagrammatic perspective view of the lock elements illustrating the construction of these.

Fig. 10 is a side elevation of a modified form of the compound aeroplane.

Fig. 11 is a front elevation of the form of aeroplane shown in Fig. 10.

Fig. 12 is a plan view of the form of aeroplane shown in Fig. 10.

Figure 4:
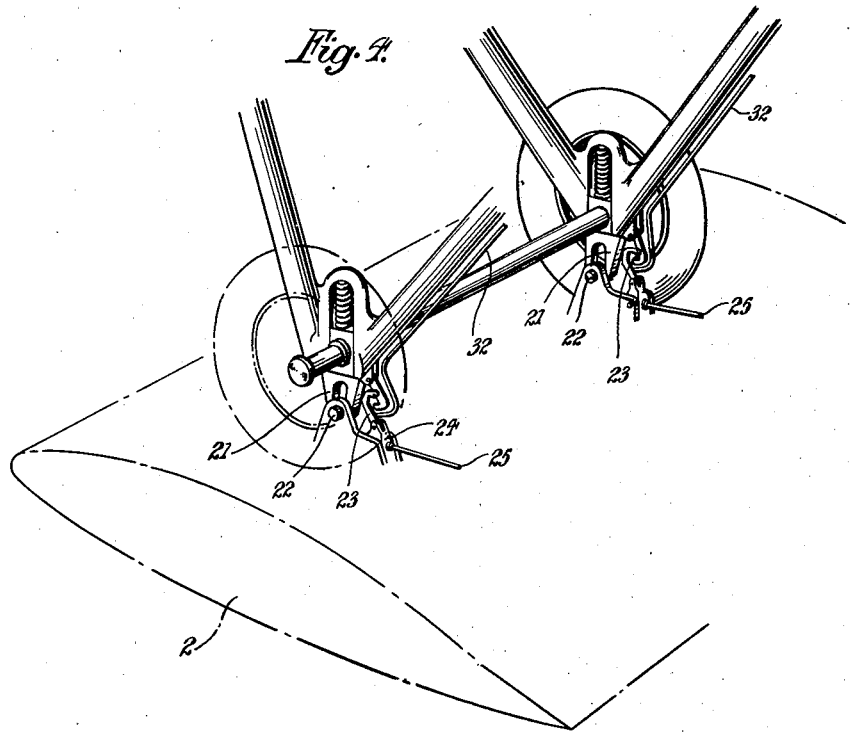
Fig. 4 is an enlarged perspective view of part of the undercarriage of the upper auxiliary aircraft and part of the wing of the lower main aircraft, showing the means for attaching these parts together.

The compound aeroplane illustrated in Figs. 1 to 3 consists of a lower component of the monoplane type, and an upper component of the biplane type.

The lower main component comprises the body 1; monoplane wings 2, 2; twin engines mounted in the engine housings 3, 3, and driving airscrews 4, 4, said housings carrying landing wheels 5, 5, (which may be retracted in any known manner into the rear of the engine housings on the wings); a tail wheel 6; a tail plane and elevators 7, and twin fins and rudders 8, 8. As generally indicated by the drawings, this lower component is essentially a twin engine monoplane of normal design, of low resistance, capable of carrying very heavy wing loadings, and of flying at high speeds.

The upper auxiliary component comprises the body 9; the biplane wings 10, 10, 10, 10, with appropriate interplane struts and wiring; and a single engine partly enclosed in the cowling 11, and driving the airscrew 12. The tail plane and elevators 13, and the central fin and rudder 14, are of conventional form and arrangement, but are of abnormally large area in relation to the tail plane, elevators and rudder of the lower main component. In addition, this upper auxiliary component is provided with landing wheels 15, 15, and a tail wheel 16.

Apart from the abnormal area of tail plane and elevators 13, and rudder and fin 14, this upper component is of normal single engined biplane design, and of a type suitable for carrying large loads with a moderate wing loading, and at relatively low speeds. For the purpose of the present invention, however, the load to be carried by this component will be some part of the load carried by the lower main component, and hence this upper auxiliary component is required to provide in its body 9, only accommodation for one pilot, and for fuel for a relatively short flight. Hence as a separate aircraft this component carries very little load, and has an extremely light wing loading.

These two components of the compound aeroplane are, for the purpose of combined flight, attached one to the other at three points, namely at 17, 17 and at 20 by attachments which may be released at will by the pilot of one or other component. The two forward attachment points 17, 17 consist of suitable attachments on the upper surface of the wing of the lower main component, and mating attachments on the undercarriages supporting the landing wheels 15, 15 of the upper auxiliary component. It will be seen that in the arrangement shown in the figures, when the compound aeroplane is standing on the ground on the landing wheels 5, 5, of the lower main component, the loads due to the weight of the heavily loaded lower component are taken directly by its own landing wheels and the loads due to the weight of the upper component are transmitted directly through the wing structure of the lower component to the landing wheels without imposing bending loads on the wings of the lower component. At the rear point of attachment 20, the body of the main lower component is releasably attached to the member 18 which is hinged to the body of the upper auxiliary component at 19.

When the two component aircraft are thus assembled the resulting compound aeroplane is a triplane, having three engines and airscrews, with approximately two and one half times the wing area of that of the lower main component.

The compound aeroplane has two sets of landing and tail wheels, and two sets of tail planes and elevators, and will in addition possess two sets of ailerons (not shown), one set on each component.

The lower main component will carry fuel for two engines for a long range at high speed, and a large useful military or other load, whereas the upper auxiliary component will carry only one pilot, fuel for its one engine for a short period, and a minimum of necessary equipment, and the total weight of this upper component will, therefore, be only a small proportion of the total loaded weight of the lower main component.

Thus, the lower main component by itself will have a very high wing loading, the upper auxiliary component by itself will have a very low wing loading, and the two components when combined into a compound aeroplane will have an intermediate, moderate wing loading, and, consequently, will be capable of taking off and flying at a moderate speed.

The characteristics of the compound aeroplane and of the components thereof may be made clear by numerical example as follows. The Figs. 1, 2 and 3, may be taken to represent to scale a compound aeroplane whose wing span is 63 feet. To this scale the main lower monoplane component is an aircraft of approximately 650 square feet wing area, and the upper auxiliary biplane component is of 880 square feet wing area. The total area of the compound aeroplane is thus 1530 square feet.

The total weight of the lower main component fitted with two engines each of 650 horse power output, carrying a crew of three and some 1500 lbs. of military equipment or other useful load, would be about 15000 lbs., giving a wing loading of approximately 23 lbs. per square foot of wing area, or more.

A machine having these characteristics would be expected to have a maximum speed of nearly 250 miles per hour at full engine power. But the minimum speed for taking off would be 85 miles per hour or more, and with engines and airscrews designed to operate efficiently at 250 miles per hour, normal methods of launching such a machine (i. e. by taking off from the ground) would be at least extremely hazardous and would probably be ineffective.

The auxiliary component, carrying a pilot alone, and fuel for about one hour's flight, would have a total weight of the order of 5000 lbs., assuming its single engine to be of the same power as each of the engines of the main component. The wing loading would be approximately 6 lbs. per square foot, and the minimum take-off speed would be about 40 miles per hour or possibly even less. It would be fitted with airscrews designed for maximum output and efficiency at low speeds, (i. e. about 100 miles per hour) and would have abnormally rapid acceleration and a very high rate of climb.

The compound aeroplane with its components loaded would thus weigh about 20000 lbs. giving a wing loading on 1530 square feet of approximately 13 lbs. per square foot, corresponding to a take-off speed of about 60 to 65 miles per hour.

By virtue of the high effectiveness at low speeds of the engine and airscrew of the upper auxiliary component, as compared to the ineffectiveness of the two engines and airscrews of the lower main component at the same low speeds, the tractive effort available to the compound aeroplane during acceleration on the ground will be increased in such greater ratio than that represented by the ratio of the maximum output of the three engines of the compound aeroplane to that of the two engines of the main component so that the effective power available during the take-off period might quite easily be doubled, whereas the weight to be accelerated has only been increased by one third. Thus, the compound aeroplane has a considerably increased acceleration and a considerably reduced take-off speed as compared to that of the main component, and will be capable of taking off from the ground and climbing at a reasonably rapid rate.

The compound aeroplane thus provides a means whereby the heavily wing loaded main component may safely and effectively be launched from the ground.

In view of the enormous disparity between the wing loading of the two separate components, it will be obvious that during their combined flight as a compound aeroplane, the wings of the upper auxiliary component will always be lifting more than the weight of the auxiliary component alone and that the wings of the main component will normally be lifting less than the weight of the main component alone. Hence there will be at the attachments 17, 17 and 20 a tension load, such that on release of these attachments the upper auxiliary component will at once accelerate upwards and the main lower component will at once accelerate downwards, thus ensuring immediate separation of the two components.

If it be assumed that the wings of the two component aircraft have identical lift characteristics, and are, in the compound aeroplane, set to give equal lift coefficients at any angle of incidence of the complete compound aeroplane, then the proportion of the total lift contributed by the two components will be in direct proportion to their wing areas, and independent of the particular condition of flight of the compound aeroplane. Hence under these assumed conditions, a separating (tension) force will exist at the attachments under any condition of flight, and release of the attachments would automatically cause the upper auxiliary component to rise clear of the lower main component.

In general, however, the lift characteristics of the two sets of wings will not be the same, and the lift distribution as between the wings of the two components may change with change in the angle of incidence of the whole compound aeroplane. It will, however, be obvious that, with a compound aeroplane in which the wing loading of the two components separately shows so large a disparity as is suggested herein, no special precautions are required to ensure that the upper component shall always be contributing a proportion of the total lift in excess of the proportion which its own weight bears to the total weight of the compound aeroplane.

It will be appreciated that the relative wing loading of the two components of a compound aeroplane according to this invention may vary appreciably from those given in the numerical example, but in order that the auxiliary component may be effective in considerably improving the take-off characteristics of the main component, the auxiliary will in practice always have a much lighter wing loading. In order to ensure that at no condition of possible flight of the compound aeroplane shall the lift distribution change so as to cause the lower main component to be lifting more than its own proportion of the total load air borne by the compound aeroplane as a whole, it is necessary only to ensure that at no such condition of possible flight shall the ratio of the lift coefficient of the wings of the lower component to the lift coefficient of the upper component exceed the ratio of the wing loading of the upper component to the wing loading of the lower component, but in view of the relatively small variation in characteristics of practicable aeroplane wings, and the necessarily large disparity in wing loadings as between the two components, no difficulty is likely to occur on this score in practice.

It has already been mentioned that the lower main component with its high wing loading and general low wind resistance will be suitable for operation at high speed and will be provided with airscrews giving high efficiency and output at such high speeds. It has also been pointed out that the upper auxiliary aircraft, with its light loading, and consequently high wind resistance, will, by itself, be capable of only a relatively low speed. It is obvious, therefore, that the compound aeroplane will be capable of a speed intermediate between the speeds of which the components separately are capable, and hence that when the compound aeroplane is flying as a whole at, or near, the maximum speed of which it is capable, the engines and airscrews of the lower main component will be contributing some part of the thrust required to give to the upper auxiliary component a speed greater than that of which it is capable as a separate aircraft. This condition will hold at any speed above that of which the auxiliary alone is capable. Hence at any such speed, there are, in addition to the tension forces in the attachments 17, 17 and 20 which tend to separate the two components vertically, shear forces which tend to make the lower main component move forward of the upper auxiliary component.

Hence if the attachments 17, 17 and 20 are released under such conditions, the upper auxiliary component will at once tend to rise above the lower main component, and, at the same time, the lower main component will accelerate, and the upper auxiliary component will be retarded, and still further ensure rapid separation of the two components.

After such separation, the two components will be enabled to fly as separate units, the main heavily loaded component proceeding to its destination, or upon its duties, and the auxiliary will return to its base where it may be used for launching a further main aircraft.

In order that the process of thus launching a heavily loaded main aircraft by forming a compound aeroplane by the addition of an auxiliary component, it will be necessary to ensure that the flight of the composite aircraft shall be completely under the control of one pilot who shall be in charge of the whole compound aeroplane during the whole of such combined flight, including the period of taking off. It will, moreover, be obvious that the same pilot in charge must be able to control the compound aeroplane during landing as a compound aeroplane, in case engine failure or similar mishap shall render a successful separation of the components impossible.

It will be understood that in any event each component will have a pilot who will be in charge of his respective component during the separated flight of the two components, and the pilot in charge of the compound aeroplane may be either the pilot of the main, or of the auxiliary aircraft, but may more conveniently be the pilot in charge of the auxiliary component.

In order that such control of the compound aeroplane by the one pilot in charge may be possible, the flying controls of the two components may be interconnected, by suitable connections released at the same time as the main connections between the two aircraft components.

Alternatively, the flying controls of one component may be locked in a central neutral position during such combined flight, the other component being provided with control organs sufficiently powerful to control the whole composite aircraft, such locking of the controls being automatically removed at release of the two components, as by the withdrawal of a locking pin carried on one component, from a locking plate carried on the other component.

Alternatively, the control surfaces of one component might be left free, floating in the airstream due to the motion of the compound aeroplane.

In the Figures 1, 2 and 3 to which reference has already been made it has been noted that the tail plane and elevators 13 and the rudder and fin 14 of the upper auxiliary component are abnormally large, and according to a preferred construction, the auxiliary upper component would be fitted with such abnormally powerful flying control surfaces, sufficient to control the flight of the compound aeroplane when those of the main were either locked or floating, it being understood that in such a case the pilot in charge of the compound aeroplane will be the pilot of the auxiliary component.

In this preferred construction, and in any other, effective communication between the two pilots during the combined flight of the compound aeroplane is desirable and may be effected by wireless telephony or by wired telephones whose connections are broken automatically at the release of the two components.

Such communication will be desirable for warning the pilot of the one component that the pilot in charge of the compound aeroplane is about to release the two components, and may be used also to direct the auxiliary pilot to make any variation in control setting which might be desirable during combined flight, in the event of the controls of both components being in use during such combined flight.

Moreover, in the event of an emergency rendering it necessary for the landing of the compound aeroplane as a whole, prior to separation, it will be desirable to interconnect the engine controls of the two components in such a manner that the pilot in charge has control of the throttles and switches of all the engines of both components.

It will be understood that the invention is not limited to the precise arrangement of component aircraft described and illustrated, except insofar as it is an essential feature of this invention that the upper component of the composite aircraft shall be the more lightly loaded component.

Either component may be monoplane, biplane or multiplane, either component may have one, or more, engines, and may be adapted to land or to take-off from either land or sea, or any other surface.

It will also be understood that this method of assisting in the launching of a heavily wing loaded aircraft does not preclude the use of other known devices tending to the same end.

Methods such as wing slots and wing flaps for increasing the maximum lift of the wings, may be applied to reduce the minimum speed of support, or alternatively to increase the possible wing loading for a given minimum speed of support and hence to facilitate launching, or more usually for improving the angle of initial climb of the heavily loaded aircraft. Such devices may be applied to either or both components for similar purposes, provided always that the precautions already mentioned regarding the relative lift distributions of the two components are observed.

The device of launching a heavily loaded aircraft by adding a lightly wing loaded auxiliary to form a compound aeroplane as above described, is particularly advantageous in cases when the heavily loaded main aircraft is provided with a supercharged engine or engines.

In the example illustrated and described, the twin engines of the main component might be supercharged to give their maximum power at a considerable altitude—say 10000 feet above ground level. The result would be a very great increase in the maximum speed of that main component at such a high altitude, but this advantage would be offset by a relative diminution in the power output available from its engines at take-off. Moreover, the airscrews designed to absorb their full power at such increased speed, in the reduced atmospheric density at 10000 feet would overload the engines at ground level, so that they would be unable to develop their normal speed of rotation, and hence would greatly reduce the engine power output at taking off. In addition, the efficiency of such airscrews under taking off conditions would be seriously reduced, consequently the difficulty of launching such a compound aeroplane would be greatly increased by the use of such engines.

The engine, or engines, of the auxiliary aircraft would, however, not be of the supercharged high altitude type, but might be of the so-called "ground booster" type, i. e. fitted with a supercharger which would greatly increase the power available at ground level for short periods—such as would be involved in taking off. Such engine or engines would in addition be fitted with an airscrew or airscrews capable effectively of using such increased power at ground level and at a low speeds. Hence the increase in power available for acceleration caused by the addition of the auxiliary component might in such a case be far greater than in the case when the main and auxiliary aircraft were both provided with normal engines of the unsupercharged type.

It will be understood that in any form of compound aeroplane, whether the main heavily loaded component be the lower, as illustrated in the Figs. 1 to 3 of the accompanying drawings, or the upper, as has been proposed in other cases, separation of the two components is possible only when the upper of the two components has sufficient lift to ensure that it shall rise above the lower component upon release. This condition requires that there shall be a tension load at the attachment points 17, 17 and 20, in the case in question.

In Fig. 1 the position of the centre of gravity of the two components has been marked A for the upper component and B for the lower component, and the center of gravity of the whole compound aeroplane, which must be intermediate between the centres of gravity of the components, has also been indicated at C. It will be observed that the centres of gravity of the two components are substantially vertically one above the other. In order that the compound aeroplane may fly in equilibrium it is obvious that the total forces on the whole compound aeroplane shall have a resultant passing through C. Such a condition of equilibrium of the compound aeroplane as a whole may, however, occur under conditions when the resultant air forces on the two components separately considered do not pass through the common centre of gravity C. The resultant on the upper component, for instance, might pass behind and that of the lower component ahead of the common centre of gravity C of the whole. Since in flight these resultant forces act generally upwards there would then exist couples acting on the two components, tending to cause the tail of the upper component to rise, and that of the lower component to drop. If the two components were separated under such conditions, the angle of incidence of the upper component would at once decrease, that of the lower at once increase, causing the upper component to dive and the lower to climb, and would thus tend to cause a collision between the separated components.

The existence of such disturbing couples would lead to variation in the distribution of the loads as between the three attachment points 17, 17 and 20 while the components were still connected.

The condition in which no such couple existed would require that the total load carried by the two forward attachment points 17, 17, multiplied by their distance forward of the common centre of gravity C should be equal to the load at the rear attachment point 18 multiplied by its distance behind the common centre of gravity C. A couple tending to separate the two tails would involve an increase in the tension load at 20, and a couple tending to cause the tails to move towards each other would involve a decrease in that load.

The load measuring devices to be hereinafter described, which are incorporated in all the attachments between the two components, indicate the magnitude of the force at each attachment, to the pilot who is in control of the compound aeroplane, in order that he may ensure that the relative distribution of load at the attachment points is such that separation may safely be effected.

As shown in Fig. 4 the undercarriage of the upper component carries at its lower extremities jaws 21, 21, adapted to receive the pins 22, 22, carried from the wing frame of the lower component (part of the wings 2 of which are shown in dotted lines). The engagement of the pins 22, in the jaws 21 serves to locate the wing of the lower component in a fore and aft direction relative to the upper component, the pins, however, being free to drop out of the jaws.

Attached to the undercarriage frame of the upper component adjacent each jaw 21, are load measuring devices indicated generally by the reference 23 in Fig. 4, which are, in turn, attached to the wing frame of the lower component by a quick release device 24 adapted to be operated by the pilot in charge of the compound aeroplane through the operating cables 25, in such a manner that the loads securing the lower component to the upper component at these attachments pass through the load measuring device 23.

Figures 5, 6:
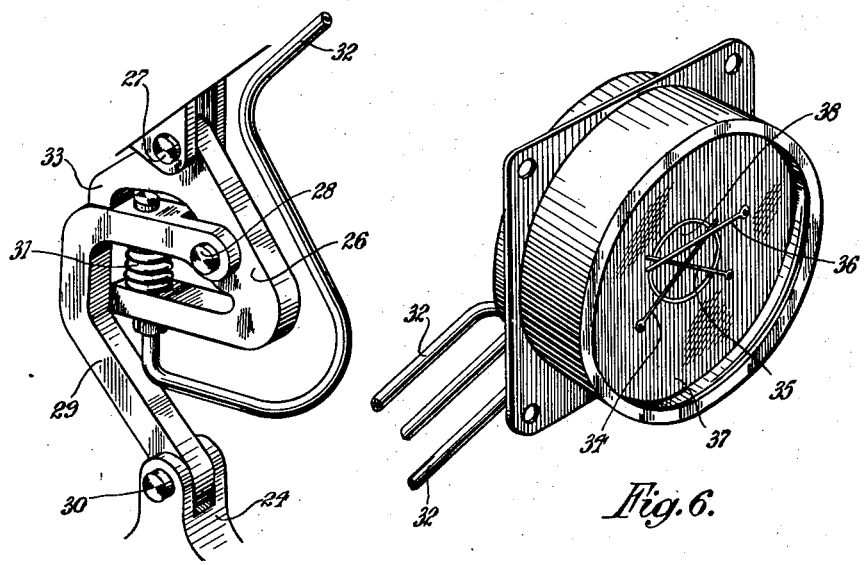
Fig. 5 is an enlarged perspective view of one of the load measuring devices.
Fig. 6 is a perspective view of the pressure gauge.

A suitable load measuring device is shown in Fig. 5. This consists of a cranked link 26, attached to the undercarriage frame of Fig. 4 at 27. Pivoted to the link 26 by the pin 28 is a second cranked link 29, which is attached by the pin 30 to the quick release device 24. Interposed between the two parallel arms of the cranked links 26 and 29 is an elastic capsule 31, preferably of metal, and capable of resisting a high internal pressure. Capsule 31 is completely filled with a substantially incompressible fluid—oil or mercury for instance—and communicates by means of the pipe line 32 with a suitable pressure gauge installed in the pilot's cockpit of the upper component of the compound aeroplane. The reading of the said pressure gauge will be directly proportional to the tension load across the complete load measuring device.

Since it is essential for safe separation of the two components that the loads at the attachments shall be tension loads, it is necessary only to measure the loads in the one direction, a compression load across the load measuring device would give zero reading on the pressure gauge, and such a zero reading would indicate the absence of the required tension.

In order to prevent undue relative movement of the two components in the event of a compression load occurring at the attachments, a stop member 33 is arranged on the link 26, which abuts on the link 29, and prevents the aircraft from moving towards each other if such a compression load exists.

It is, however, obvious that a second collapsible fluid filled capsule might be inserted in place of stop 33, and be connected to a second pressure gauge or these two opposed capsules might be connected to the two sides of a differential pressure gauge, to indicate the magnitude of either compression or tension loads at such a load measuring device. This form of load measuring device would be advantageously used in the case of compound aeroplane where the upper component is the main aircraft.

It will be understood that in the compound aeroplane, the load measuring devices as described would be incorporated in all the attachments between the two components, i. e. in Figs. 1 and 2 at 17, 17 and 20.

In order to give an easily understandable indication to the pilot in charge of the compound aeroplane of the state of such loads and moments, it is preferred that three attachments and three load measuring devices be provided between the two components, two as at 17, 17, Figs. 1 and 2 ahead of the common centre of gravity C of the compound aeroplane, and disposed laterally equidistant on each side of this centre, and the third, as 20 (Figs. 1 and 2), centrally behind the said common centre of gravity C.

It will be seen that for equilibrium of the separated components the loads at the two attachments 17 should be equal, otherwise on separation one or other or both of these components will be disturbed laterally. It is further necessary that the load at the rear attachment 20 should bear a certain relation to the loads at each of the two forward attachments, though this relation may vary within certain limits, since a small tendency for the tails of the two components to move together may be safe and even advantageous at the moment of release, since such tendency will cause the upper component to climb and the lower one to descend.

Accordingly the pressure capsules of the load measuring devices at the forward attachments 17, 17 may be connected by the pipes 32, 32 to pressure gauges arranged side by side in the same case and having their needles working over a common face, these needles of the two gauges being arranged so that the positive pressures cause clockwise movement of one needle but anti-clockwise movement of the other needle, as indicated in Fig. 6, where 34 is the needle for one lateral load indicator, reading positive pressure clockwise, and 35 is the needle for the other lateral load indicator, reading positive pressure anti-clockwise. Needles 34 and 35 overlap, and when the pressure at 17, 17 is equal these two needles will intersect on a vertical line located midway between their two centres.

The load indicating capsule at the rear attachment 20, which will be constructed and arranged the same as those at 17, is connected by a third pipe marked 32 to a third pressure gauge, also contained in the common case, having its needle disposed laterally of the other two pressure gauges, and indicating a positive pressure by upward movement of the needle 36 for instance.

It will be seen that the three needles, which overlap, may be arranged to intersect at one central point for a given desirable load distribution and magnitude and at other load distributions will form a triangle. The safe limits of load distribution having been determined, it is then necessary only to ensure that the intersection of the two needles 34 and 35 of the gauge lie on a central vertical line, and that the triangle formed by the intersection of all three needles falls within certain limits, to ensure that conditions for safe separation exist. Such limits may be marked on the dial, for instance as in Fig. 6, by partially or wholly obscuring the dial except within the necessary limits by means of the masks 37 and 38.

Other forms of load sensitive devices than the fluid filled capsule may, of course, be employed, in the load measuring devices, for example plungers working in fluid filled cylinders operating pressure gauges, or an electrical resistance of the type whose resistance varies with pressure, used in conjunction with a source of electric current and current measuring instruments.

Equally alternative arrangements of the links between which the pressure sensitive devices are inserted may be substituted for the arrangement described and illustrated.

Similar load sensitive devices may also be employed in the attachments between the components of a compound aeroplane to operate locking plungers which would prevent the release of the attachments between the components until the tension loads in the said components reached safe predetermined limits. For this purpose a compound lock such as is illustrated in Figs. 7, 8 and 9 may be employed. This lock consists of a plunger 39 provided with a handle 40 and attached to the cable 41 which is connected by any convenient system of rods, levers and/or cables to the quick release devices 24 (Figs. 4 and 5) of the three points of attachment between the components of the composite aircraft, so that on pulling the plunger 39 in the direction of the arrow in Fig. 9, all three attachments are simultaneously released. Plunger 39 is provided with three keys 42, 42, 42 (one corresponding to each point of attachment between the components) and with a further key 43, engaged with, but slidable through, a keyway 50 in the fixed ward member 44, rendering it impossible to rotate plunger 39 relative to the frame 48 of the lock.

Threaded upon the plunger 39 and mounted in the frame 48, so that they are partially rotatable, are three tumblers 45, 45, 45, each tumbler having a central hole fitting the plunger 39, and a slot or keyway 49 of a size at least sufficient to permit of the passage through the tumblers of the keys 42, 42, 42. Each tumbler is provided with a projecting lever or head which makes contact on one side with a spring device 46 (Fig. 8) tending to rotate the tumbler into a position such that the keyway 49 is forced out of alignment with the keyway 50 in the fixed ward member 44. In addition, the head or lever of each tumbler makes contact on the other side with an extensible capsule 47 (Fig. 8). Each of the three capsules 47 (one for each tumbler 45) being connected by a pipe line 32 to the corresponding pipe line 32 of one of the pressure transmitting capsules at the points of attachment (as shown in Figs. 4 and 5).

It is to be understood that when the whole compound lock now being described is assembled with the plunger 39 in its closed position corresponding to the secured position of the quick release devices 24 (Figs. 4 and 5) each of the keys 42 lies closely behind the corresponding tumbler 45 and the plunger 39 cannot be withdrawn to release the said devices unless the keyways 49 in all three tumblers 45 are in alignment with the keyway 50 in the fixed ward 44. The spring members 46, however, are so set and adjusted as to force the tumblers to rotate until the keyways 49 in the said tumblers are out of alignment with the keyway of fixed ward 44.

Pressure transmitted to any one of the capsules 47 by the application of a load to the capsule 31 (Fig. 5) at the corresponding point of attachment between the components of the composite aircraft will tend to rotate tumbler 45 contacting with said capsule in a direction tending to bring the keyway 49 in that tumbler into alignment with the keyway 50 in the fixed ward 44, and by correct proportioning of the capsule 47 and of the spring member 46 it may be ensured that such alignment shall occur only when the load at the corresponding attachment point has some predetermined desired value.

If each keyway 49 is of such dimensions as just to fit the key 42, then passage of the key 42 through the keyway 50 will occur at one value only of such pressure, since increase of pressure above said value will cause further rotation of the tumbler 45. If, however, such keyway 49 be made wider than the corresponding key 42, this key will be able to pass through the keyway for a range of positions of the tumbler 45 and consequently for a range of loads at the corresponding attachment points.

It will be seen that in order that it may be possible to pull out plunger 39 and to release the attachments between the components, all the three tumblers 45 must be simultaneously rotated by expansion of their controlling capsules 47 in response to the loads at the three points of attachment, and that such simultaneous rotation to such a position can occur only when the loads at such points lie within any desired limits.

In this manner an automatic locking of the quick release devices at the attachments between the components of the composite aircraft is provided which will prevent release of the said components unless a satisfactory distribution of loads exists at the said attachments.

In the modified construction illustrated in Figs. 10 to 12, the auxiliary aircraft element is mounted on top of the main aircraft element. The auxiliary aircraft comprises a single central fuselage 51 having a single normal tail 52 and having a single engine (not shown) for driving the propeller 53. This auxiliary aircraft is provided with biplane wings 54 and 55 and a wheeled undercarriage 56.

The lower main aircraft element comprises twin side by side fuselages or outriggers 57 and 58, having separate tails 59, 60, and carrying two engines (not shown) for driving the propellers 61, 62. The fuselages or outriggers 57 and 58 are carried by a monoplane wing 63 which extends outwardly from each side of a central cabin 64 for carrying the pilot and passengers or armaments or goods, together with the control gear for the main aircraft element.

These aircraft elements are attached together by two releasable attachment fittings 65 at the bottom of the wheeled undercarriage 56 and on the wing 63 of the lower aircraft element. They are also attached by a releasable link 66 pivoted on the fuselage 51 of the upper aircraft and releasably engaging with a fitting 67 on the top of the cabin 64 approximately midway between the wings and the tails of the two aircraft elements.

Alternatively, in this modified construction the element having the single central fuselage and a single tail may be the main aircraft, while the element having the twin side by side fuselages each carrying a separate tail may be the auxiliary aircraft. Further, this modified construction may be applied to a compound aeroplane in which the main aircraft is mounted above the auxiliary aircraft.

What I claim as my invention and desire to secure by Letters Patent is:—

1. A compound aircraft comprising two powered aeroplanes mounted one on top of the other, the lower aeroplane to be the craft to be launched and incapable of unassisted takeoff, means for rigidly but releaseably attaching said aeroplanes together so that they both assist in the take-off and climb of the compound aircraft, the upper aeroplane being lightly wing loaded with respect to the lower aeroplane so as to contribute lift in excess of its own weight to assist the lower aeroplane to take-off and to climb, whereby on release of said attaching means said upper aeroplane will, owing to said excess lift over its own weight, rise relatively to said lower aeroplane and thus effect separation of the two aeroplanes.

2. A compound aircraft comprising two powered aeroplanes mounted one on top of the other, the lower aeroplane to be the craft to be launched and incapable of unassisted take-off, means for rigidly but releasably attaching said aeroplanes together so that they both assist in the take-off and climb of the compound aeroplane, the upper aeroplane being lightly wing loaded with respect to the lower aeroplane so as to contribute lift in excess of its own weight to assist the lower aeroplane to take-off and to climb, and said lower element being constructed, arranged and provided with propulsive means to fly at a higher speed than the upper element so that when the compound aeroplane is in flight at any speed approaching its maximum speed the lower element will contribute a greater propulsive thrust than is required to overcome its own wind resistance, whereby on release of said attaching means said upper plane will lag behind the lower element and, owing to said excess lift over its own weight, rise relatively to said lower aeroplane and thus effect separation of the two aeroplanes.

3. A compound aircraft comprising in combination a heavily wing loaded powered aeroplane, a lightly wing loaded aeroplane, a plurality of means for rigidly but releasably attaching one of said aeroplanes above the other so that they can take-off and climb as a compound aircraft and thereafter by releasing such attaching means be separated, a plurality of means for measuring and indicating during the flight of the compound aircraft the forces transmitted through said attaching means, one measuring means in each of said attaching means, a release member movable to release all of said attaching means simultaneously, and means for correlating said measuring and indicating means for the various connecting means whereby the relative extent of the forces in said connecting means may be readily ascertained.

4. A compound aircraft comprising in combination a heavily wing loaded powered aeroplane, a lightly wing loaded aeroplane, a plurality of means for rigidly but releasably attaching one of said aeroplanes above the other so that they can take-off and climb as a compound aircraft and thereafter by releasing such attaching means be separated, a plurality of means for measuring and indicating during the flight of the compound aircraft the forces transmitted through said attaching means, one measuring means in each of said attaching means, a release member movable to release all of said attaching means simultaneously, a plurality of locking devices, one for each of said measuring means, actuated by the forces in said measuring means and normally locking said release member against releasing movement, said locking means being operative to release said release member upon predetermined forces being obtained in each of said measuring means.

5. A component aircraft comprising in combination a heavy wing loaded powered aeroplane, a lightly wing loaded aeroplane, a plurality of means for rigidly but releasably attaching one of said aeroplanes above the other so that they can take off and climb as a compound aircraft and thereafter by releasing such attaching means be separated, a plurality of pressure responsive devices, operated by the forces transmitted through said attaching means, one associated with each of said attaching means, a release member movable to release all of said attaching means simultaneously, a plurality of locking devices, one for each of said attaching means, actuated by said pressure responsive devices and normally locking said release member against releasing movement, said locking means being operative to release said release member upon predetermined forces being obtained in each of said attaching means.

JOHN DUDLEY NORTH.